United States Patent [19]
Takasaki et al.

[11] Patent Number: 5,222,158
[45] Date of Patent: Jun. 22, 1993

[54] PATTERN RECOGNITION APPARATUS

[75] Inventors: Naruto Takasaki, Kawasaki; Yutaka Tanaka, Yokohama, both of Japan

[73] Assignee: Hitachi Software Engineering Co., Ltd., Yokohama, Japan

[21] Appl. No.: 362,320

[22] Filed: Jun. 6, 1989

[30] Foreign Application Priority Data

Jun. 6, 1988 [JP] Japan .................................. 63-139150

[51] Int. Cl.$^5$ .............................................. G06K 9/00
[52] U.S. Cl. ........................................ 382/44; 382/55; 382/60
[58] Field of Search ................ 382/21, 22, 25, 45, 382/67, 52, 44, 60, 55; 364/518, 516; 358/457

[56] References Cited

U.S. PATENT DOCUMENTS

| | | | |
|---|---|---|---|
| 3,925,760 | 12/1975 | Mason et al. | 382/60 |
| 4,147,928 | 4/1979 | Crean et al. | 382/44 |
| 4,272,756 | 6/1981 | Kakumoto et al. | 382/44 |
| 4,428,077 | 1/1984 | Shimada et al. | 382/44 |
| 4,839,824 | 6/1989 | Ando | 358/107 |
| 4,908,872 | 3/1990 | Toriu et al. | 382/21 |

FOREIGN PATENT DOCUMENTS 117381 3/1985 Japan .

*Primary Examiner*—Leo H. Boudreau
*Attorney, Agent, or Firm*—Fay, Sharpe, Beall, Fagan, Minnich & McKee

[57] ABSTRACT

A pattern recognition apparatus is capable of subjecting a large image region to image processing with an image memory having a small memory capacity and providing a contouring line data of an image in the same manner as processing with an image memory having a large memory capacity. The pattern recognition apparatus is provided with an image input means for inputting an image; an image data storing means for storing image data; a contouring line data storing means for storing contouring line data; and a contouring line data connecting means. The contouring line data connecting means is to partition image data into adjacent partitioned regions so as to allow them to overlap with each other by only one pixel, to delete a contouring line data in an overlapping portion of the adjacent partitioned regions from a contouring line data for the image data in each of the partitioned regions on the basis of a vector data passing in a predetermined direction, and to connect the contouring line data of an open drawing so as to match their terminal points in the overlapping portion thereof with each other, thereby providing a total contouring line data.

26 Claims, 4 Drawing Sheets

PATTERN RECOGNITION APPARATUS

BACKGROUND OF THE INVENTION

The present invention relates to a pattern recognition apparatus and, more particularly, to a pattern recognition apparatus capable of providing a contouring line data of image data large enough to extend over each of partitioned regions by partitioning image data into the partitioned regions and connecting each of the partitioned regions by implementing connection processing of the image data between the partitioned regions.

Heretofore, image processing apparatuses, such as computer-aided design devices (CAD) and so on, involve extracting various shapes from a line drawing containing various line segments and classifying them into line drawing elements in processing drawing data by digitizing the line drawing. As a pre-processing for classification processing or for processing pattern recognition of a drawing, there is implemented an extraction processing for extracting the contouring line data from the image data.

For such image processing apparatuses, such as CAD and the like, line drawing as an object to be processed becomes larger as technology advances in recent years so that increasing demands have been made to provide a device capable of processing drawing data of a large size. However, the image processing apparatuses have a limited memory capacity of image memory in the processing unit so that a size of the drawing capable of being read at once by the image memory and processed is limited, too. Thus, pending U.S. patent application Ser. No. 272,826, filed Nov. 18, 1988, now U.S. Pat. No. 5,134,572, to the present inventors proposes an image processing system for an image processing device such that a large image data is partitioned into partitioned regions and image processing is implemented in each of the partitioned regions, followed by the connection processing of each of the partitioned image data, thus implementing the image processing of the large image data. The partitioned image processing system proposed in the pending U.S. patent application involves image processing of the large image data partitioned.

This system permits processing a large image data by partitioning the large image data into partitioned regions and then connecting each of the partitioned regions. If this system is applied to a pattern recognition apparatus providing a contouring line data, however, a contouring line data in the large image data, when processed by partitioning into partitioned regions, becomes an open drawing in each of the regions. Accordingly, conventional technique of extracting contouring line data cannot be applied to such partitioned regions. Extraction of the contouring line data in the large image data should thus be subjected to image processing using an image memory having a large memory capacity in which image data is once stored in the image memory.

Such a conventional pattern recognition apparatus is so designed, as disclosed in Japanese Patent Publication (laid-open) No. 117,381/1985, that once image data is produced, all image data are stored in an image memory and a contouring line data is given at once.

However, conventional technique should store the given image data in an image memory at once so that it requires a large image memory in order to produce a contouring line data from a large amount of the image data.

SUMMARY OF THE INVENTION

The object of the present invention is to provide a pattern recognition apparatus capable of processing a contouring line data of a large image using a small image memory.

In order to achieve the above object, the present invention consists of a pattern recognition apparatus comprising: an image input means for inputting an image; an image data storing means for storing an image data; a contouring line data storing means for storing a contouring line data; and a contouring line data connecting means for providing a total contouring line data by partitioning the image data so as to allow adjacent partitioned regions to overlap with each other by only one pixel, by deleting a contouring line data in an overlapping portion of the adjacent partitioned regions from a contouring line data for the image data in each of the partitioned regions on the basis of a vector data passing in a given direction, and then by connecting the contouring line data of an open drawing so as to correspond to terminal points in the overlapping portion of the adjacent partitioned regions.

More specifically, a given image data is partitioned into adjacent two partitioned regions so as to allow them to overlap with each other by only one pixel, the image data in each of the partitioned regions is stored in an image memory one by one, thus converting it into a contouring line data, and a vector data passing an overlapping portion of the adjacent partitioned regions in a given direction is deleted from a vector data constituting the contouring line data in each of the partitioned regions, followed by connecting terminal points of the disconnected contouring line data having the same co-ordinate.

As have been described hereinabove, the given image data is partitioned into adjacent two regions so as to overlap the adjacent two partitioned regions by one pixel and then the image data in each of the partitioned regions are converted into the contouring line data after storage in the image memory one by one. This construction allows an image memory having a small memory capacity at the largest to correspond to a partitioned region to convert the given image data into the contouring line data. The contouring line data obtained in each of the partitioned regions is processed such that the vector data passing a predetermined direction in the overlapping portion of the adjacent two partitioned regions is deleted from the contouring line data and the contouring line data disconnected to provide an open drawing are connected so as to allow terminal points of the contouring line data to match its starting point with its end point, thus providing a contouring line daa of a whole image.

BRIEF DESCRIPTION OF THE DRAWING

Other objects, features and advantages of the present invention will become apparent in the course of the description of the preferred embodiments which follows, in the light of the accompanying drawings, in which.

DESCRIPTION OF THE PREFERRED EMBODIMENTS

Figure 5:
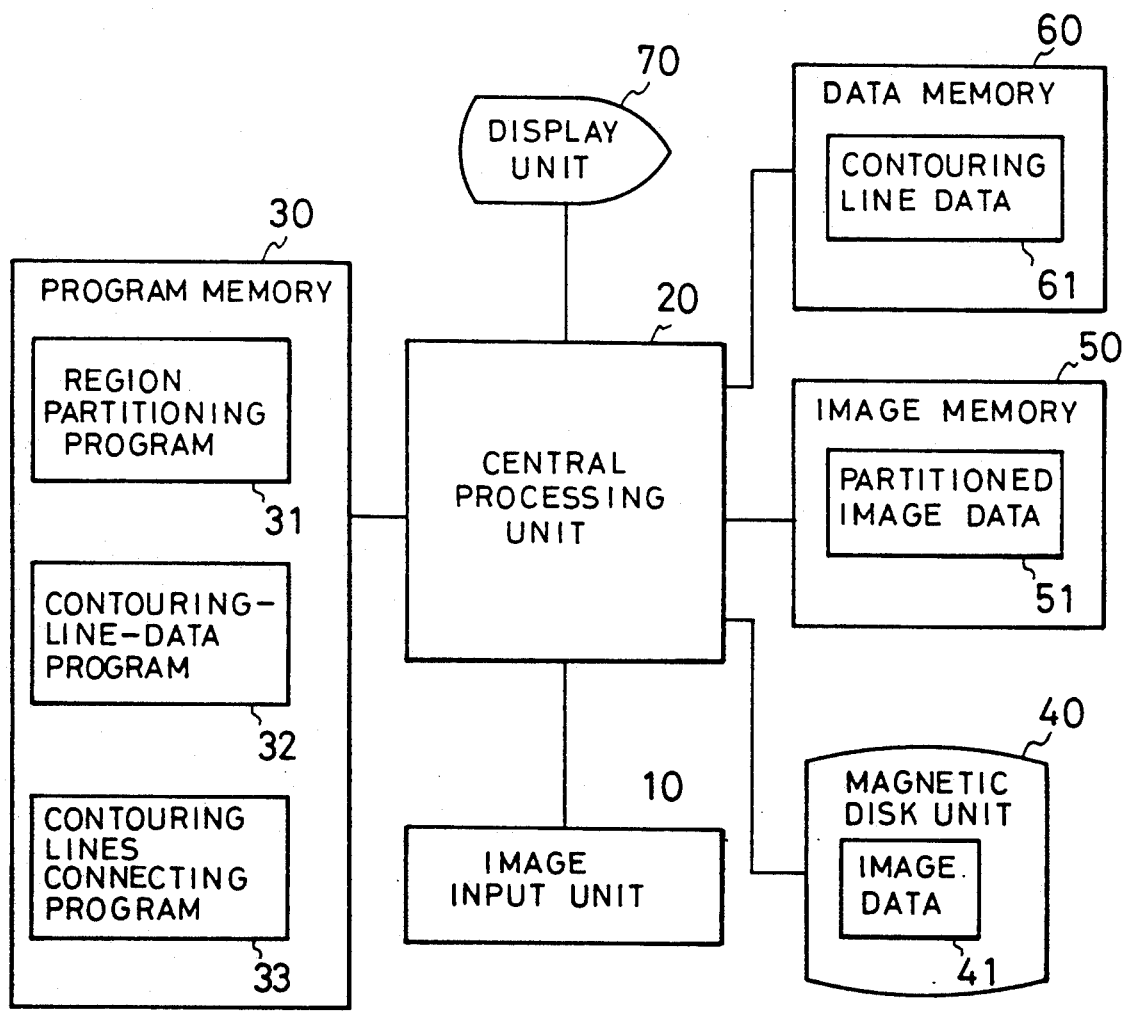
FIG. 5 is a block diagram showing an outline of the construction of the pattern recognition apparatus according to one example of the present invention.

As shown in FIG. 5, the construction of a pattern recognition apparatus according to the present invention comprises an image input unit 10 for inputting an image; a central processing unit 20 for executing various processings; a program memory (RAM=Random Access Memory) 30 for storing programs necessary for the processings by the central processing unit 20; a magnetic disk unit 40 for storing image data 41 input from the image input unit 10; an image memory (RAM) 50 for storing a partitioned image data 51 in each of partitioned regions; a data memory (RAM) 60 for storing a contouring line data 61 obtainable from a partitioned image data 51 of the image memory 50; and a display unit 70 for displaying the contouring line data 61.

The program memory (RAM) 30 stores a region partitioning program 31 for partitioning the image data 41 of the magnetic disk unit 40 and registering the partitioned image data 51 in the image memory (RAM) 50, a contouring-line-data converting program 32 for registering the contouring line data 61 in the data memory (RAM) 60 from the partitioned image data 51 of the image memory (RAM) 50, and a contouring line connecting program 33 for re-registering the contouring line data 61 by processing and connecting the contouring line data 61 of the overlapping portion in the partitioned regions.

The central processing unit 20 is to fetch in the image memory (RAM) 50 the partitioned image data 51 in each of the partitioned regions from the image data 41 of the magnetic disk unit 40 on the basis of the region partitioning program 31 in the program memory (RAM) 30, to convert and register in the data memory (RAM) 60 the partitioned image data 51 of the image memory (RAM) 50 as the contouring line data 61 on the basis of the contouring-line-data converting program 32, to re-register in the data memory (RAM) 60 the contouring line data 61 by processing and connecting a contouring line data having a component in an overlapping portion of the partitioned regions in the contouring line data 61 of the data memory (RAM) 60 on the basis of the contouring line connecting program 33, and to display the contouring line data on the display unit 70.

Figure 1:
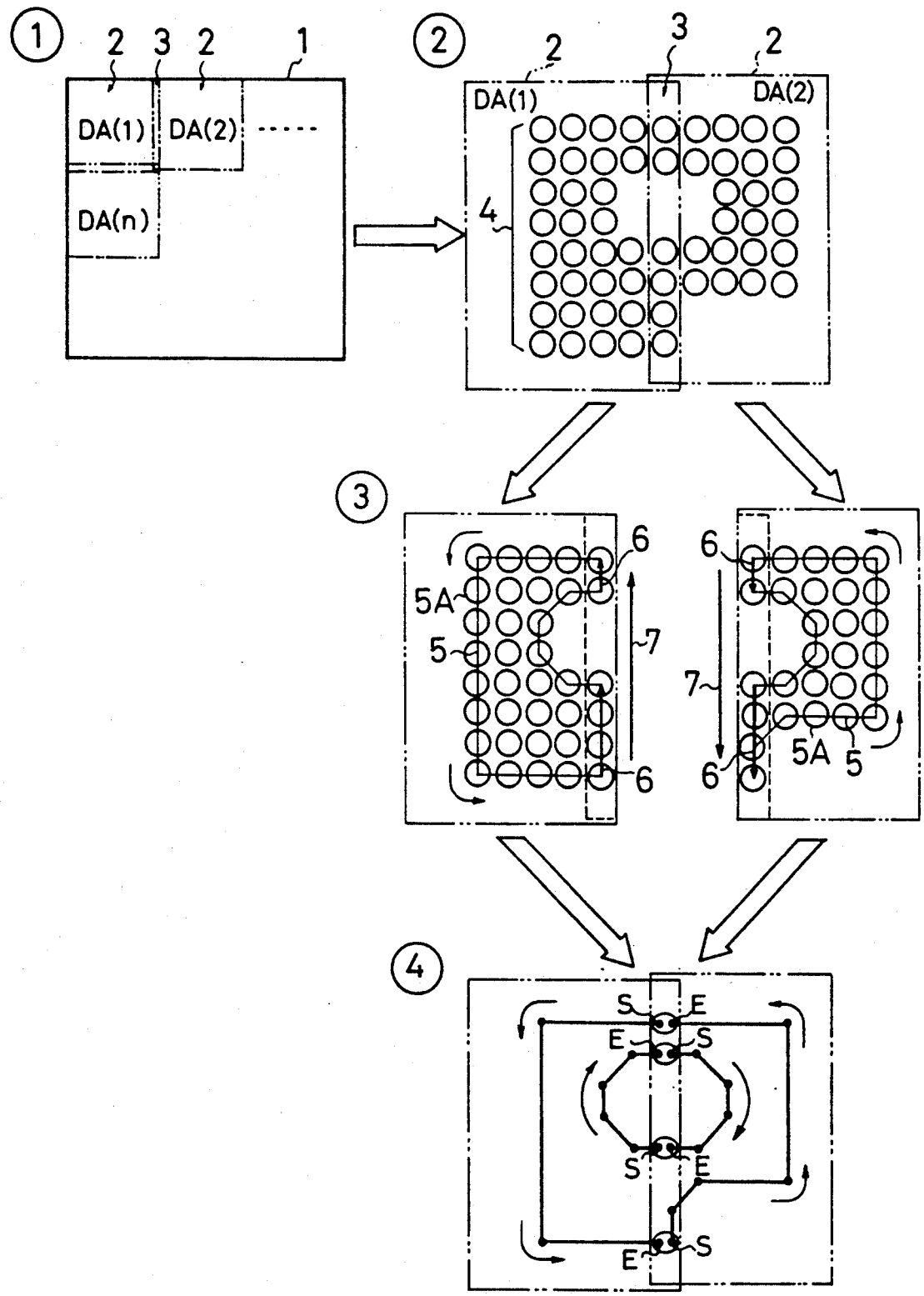
FIG. 1 is an explanation diagram for explaining the principle of conversion into a contouring line data in partitioned region according to one example of the present invention.
Figure 2:
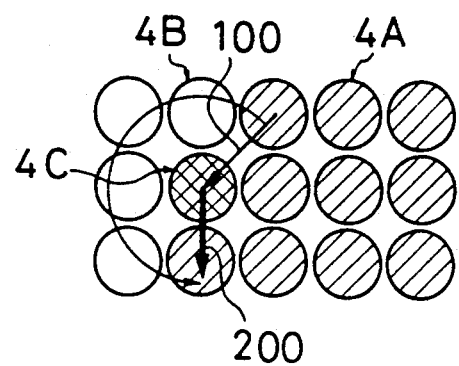
FIG. 2 is an explanation diagram for explaining the principle of tracing the contouring line according to one example of the present invention.
Figure 3:
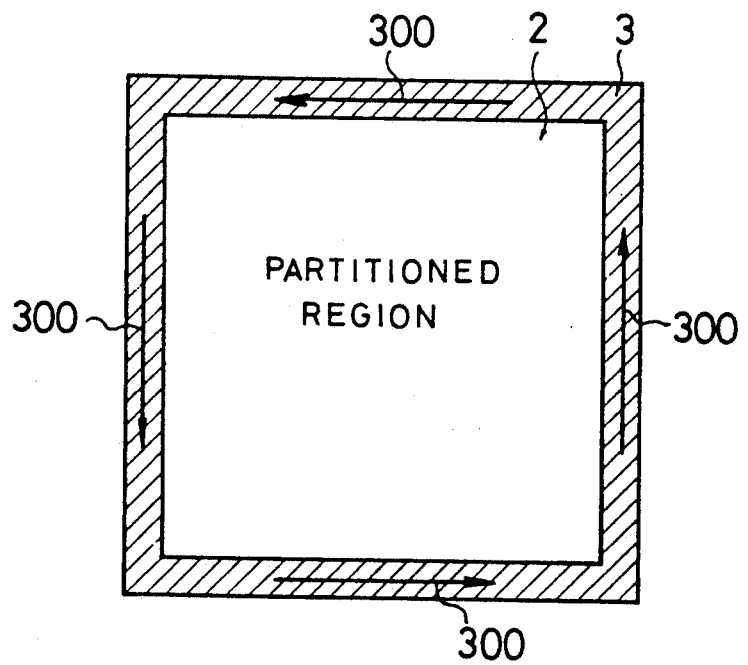
FIG. 3 is an explanation diagram for explaining a deleting direction in an overlapping portion in the partitioned regions.

The principle of converting the contouring line data by the partitioned regions according to one example of the present invention will be described. As shown in FIG. 1, reference numeral 1 denotes a total image data, and 2 denotes a partitioned region. The total image data 1 is partitioned into the partitioned regions 2 in plural regions DA(n). Reference numeral 3 is an overlapping region such as, for example, a region overlapping a partitioned region DA(1) adjacent to a partitioned region DA(2). Reference numeral 4 denotes an image data (pixel position) and reference numeral 5 denotes a contouring line data which is obtained by connecting the surrounding ones of the image data 4. Reference numeral and symbol 5A denotes a pixel of the contouring line data. Reference numeral 6 denotes a delete vector, 7 denotes a delete vector direction, reference symbol S denotes a starting point of an open drawing, and reference symbol E denotes an end point of the open drawing. As shown in FIG. 2, the image data (pixel position) 4 is indicated as each of elements such as a pixel 4A when there is the image data, a pixel 4B when there is no image data, and an observed pixel 4C. In FIG. 2, reference numeral 100 indicates a previous tracing direction, and reference numeral 200 indicates a following tracing direction. In FIG. 3, reference numeral 300 denotes a delete direction.

Figure 4:
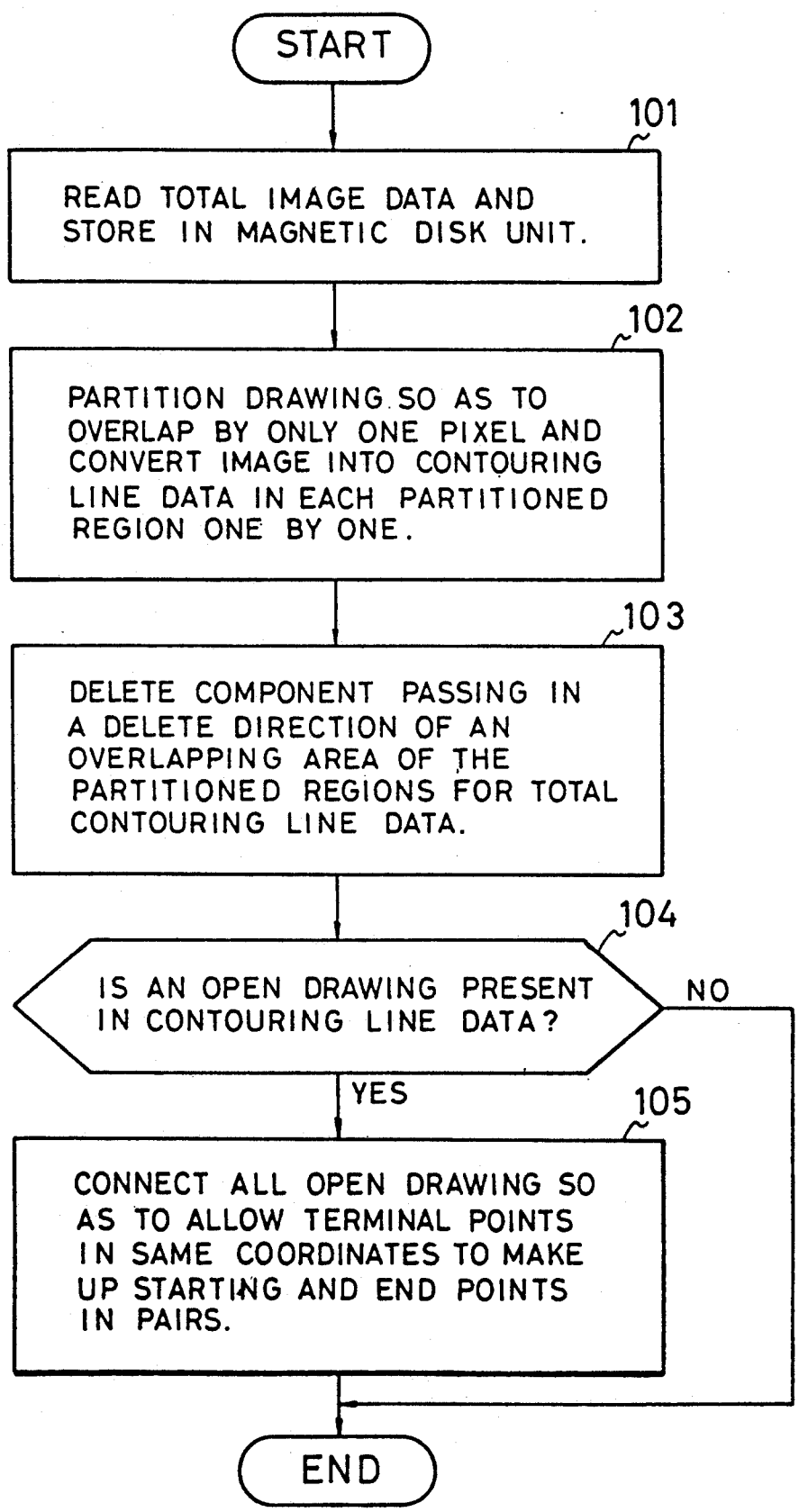
FIG. 4 is a flowchart showing procedures of processing for providing the contouring line data in the partitioned region.

FIG. 4 is a flowchart indicating the procedures of processing for producing the contouring line data in the partitioned regions.

The processing of conversion into the contouring line data in the partitioned regions will be described in accordance with FIG. 4 with reference to FIGS. 1 to 3 and FIG. 5. At step 101, all of the image data obtained from the image input unit 10 are stored in the magnetic disk unit 40. More specifically, the total image data 1 as shown in FIG. 1 ① are stored in the magnetic disk unit 40. Then at step 102, the total image data 1 is partitioned into adjacent two partitioned regions with the overlapping regions 3 in which they overlap with each other by only one pixel, thus providing the contouring line data 5 for each of partitioned screens. Referring to FIG. 1- ①, a portion indicated by DA(n) is a partitioned region 2 and, as shown in FIG. 1- ②, the image data is partitioned into a partitioned region DA(n) and a partitioned region DA(n+1) (for example, DA(1) and DA(2) so as to provide an overlapping region 3 with a width corresponding to only one pixel. In each of the partitioned regions and DA(n+1) DA(n) as shown in FIG. 2, eight pixels adjacent to the observed pixel 4C are investigated around the observed pixel 4C as a center in a counter-clockwise direction from the previous tracing direction 100 of the contouring line by tracing a direction of the pixel 4A at a position where the investigated pixel is changed from the pixel 4B without image data into the pixel 4A with the image data as the following tracing direction 200 of the contouring line data to be traced, thus providing the contouring line data 5. Then at step 103, the contouring line data obtained at step 102 is processed to delete a vector component having the same direction as the direction determined for the overlapping region 3 of the partitioned regions 2. In other words, as shown in FIG. 1- ③, vector components (which directs upwardly on the left-hand portion of FIG. 1- ③ and directs downwardly on the right-hand portion of FIG. 1- ③)) on the overlapping region 3, which corresponds to the delete direction 300 in FIG. 3, are deleted from the previous contouring line data 5. At step 104, the processing terminates when no open drawing is in the given contouring line data 5 and, when an open drawing is present therein, all open drawings having terminal points having the same coordinate are processed to connect the open drawings by pairing starting points of the open drawings with the end points and then the processing ends.

More specifically, the contouring line data 5 obtained as shown in FIG. 1- ④ has open drawings so that the open drawings having a terminal point of the same coordinate in the overlapping region 3 are processed for all the open drawings in such a manner that they are connected to each other so as to pair their starting points and end points and the processing then ends.

This system permits a correct connection of the contouring line data 5 in a pair between the partitioned regions 2 of the input image. Accordingly, the present invention presents the advantage that the image memory is at the most as large as a size of the partitioned region 2 however large the image data 4 is given in converting the input image data 4 into the contouring line data 5.

As has been described hereinabove, the pattern recognition apparatus according to the present invention is advantageous that, as it is capable of processing and connecting the contouring line data having a component in an overlapping region in the partitioned regions using drawing characteristics after the image data is converted into the contouring line data in each of the partitioned regions, it is provided with an image memory corresponding at the largest to a size of the partitioned region however large the given image data is.

The invention may be embodied in other specific forms without departing from the spirit and scope thereof. The present embodiments are therefore to be considered in all respect as illustrative and not restrictive, the scope of the invention being indicated by the appended claims, and all the changes which come within the meaning and range of equivalency of the claims are therefor intended to be encompassed within the spirit and scope of the invention.

What is claimed is:

1. A pattern recognition apparatus adapted to recognize a pattern by subjecting image data read in an image memory to image processing, comprising:
   image input means for inputting an image as image data;
   image data storing means for storing the image data;
   contouring line data storing means for storing contouring line data; and
   contouring line data connecting means for providing total contouring line data by partitioning the image data to allow adjacent partitioned regions to overlap with each other by only one pixel, by deleting contouring line data for the image data in an overlapping portion of the adjacent partitioned regions in each of the partitioned regions on the basis of vector data passing in a given direction, and then by connecting the contouring line data of an open drawing to correspond to terminal points in the overlapping portion of the adjacent partitioned regions.

2. A pattern recognition apparatus with an image memory and an image processing means for subjecting an image data read in the image memory to image processing and then recognizing a pattern, comprising:
   image input means for inputting an image as image data;
   image data storing means for storing the image data;
   contouring line data storing means for storing contouring line data;
   means for partitioning the image data into partitioned regions to allow adjacent partitioned regions to overlap with each other by only one pixel and for converting the image data in each of the partitioned regions into contouring line data; and
   contouring line data connecting means for providing total contouring line data by deleting the contouring line data in an overlapping portion of the adjacent partitioned regions on the basis of vector data passing in a given direction and then by connecting the contouring line data of an open drawing to correspond to terminal points in the overlapping portion of the adjacent partitioned regions.

3. A pattern recognition apparatus as claimed in claim 2, wherein the image memory has a region for storing image data at least in a size corresponding to a partitioned region.

4. A pattern recognition apparatus as claimed in claim 2, wherein the image processing means includes contouring line data extraction processing means.

5. A pattern recognition apparatus as claimed in claim 2, wherein the contouring line data connecting means is to delete a vector data passing in a given direction from the contouring line data in the overlapping portion of adjacent two partitioned regions and to connect terminal points having the same coordinates of the contouring line data cut into an open drawing to pair their starting and end points with each other in the overlapping portion of the adjacent regions.

6. A method for extraction of a contouring line data from an image data in a pattern recognition apparatus with an image memory and an image processing means for subjecting an image data read in the image memory to image processing and then recognizing a pattern, comprising:
   the step of partitioning the image data into partitioned regions to allow their adjacent partitioned regions to overlap with each other by only one pixel;
   the step of fetching the image data in each of the partitioned regions into the image memory one by one to produce contouring line data; and
   the step of connecting terminal points of the partitioned contouring line data having the same coordinates in an overlapping portion of adjacent partitioned regions after deleting vector data passing in a given direction in the overlapping portion of the adjacent partitioned regions from vector data constituting the contouring line data in the adjacent partitioned regions.

7. A pattern recognition apparatus, comprising:
   means for imaging an object;
   means for partitioning the image into a plurality of partitioned images, at least one of said partitioned images having a single pixel-wide region of overlap with an adjacent partitioned image;
   means for establishing a continuous partitioned image contour trace for each partitioned image;
   means for deleting a portion of at least one continuous partitioned image contour trace that lies in a region of overlap, thus creating a trace discontinuity adjacent each deleted portion, wherein each said discontinuity has a starting point and an ending point; and
   connecting means for connecting the starting point and the ending point of one partitioned image discontinuity with the ending point and the starting point, respectively, of an adjacent partitioned image discontinuity of the same region of overlap.

8. A pattern recognition apparatus as claimed in claim 7, wherein the portion to be deleted comprises at least one center pixel located between the starting and ending points.

9. A pattern recognition apparatus as claimed in claim 7, wherein a plurality of partitioned images have a single pixel-wide region of overlap with an adjacent partitioned image, and wherein said connecting means connects the starting and ending points of each partitioned image discontinuity with the ending and starting points, respectively, of an adjacent partitioned image discontinuity, thus establishing a continuous image contour trace of the entire image as established by the connected partitioned image traces.

10. A pattern recognition apparatus as claimed in claim 7, further comprising means for converting the image to object image data; and
wherein said partitioning means partitions the object image data into data representing a plurality of partitioned images, and wherein said means for establishing a continuous partitioned images contour trace establishes data representing a continuous partitioned image contour trace for each partitioned image.

11. A pattern recognition system as claimed in claim 10, further comprising:
image data storing means for storing said image data; and
contour line data storing means for storing the data for the contour trace of each partitioned image.

12. A pattern recognition apparatus, comprising:
means for imaging an object to obtain an entire object image;
image input means for converting the entire object image into entire image data;
image data storing means for storing the entire image data;
means for partitioning the entire image data into a plurality of partitioned images each represented by partitioned image data so that at least one partitioned image overlaps with an adjacent partitioned image in a single-pixel wide region;
means for establishing contour line data representing the contour of each partitioned image;
contour line data storing means for storing the partitioned image contour line data;
means for deleting data representing a portion of at least one contour line that exists in an overlap region so that a discontinuity having a starting point and an ending point results adjacent each deleted portion; and
contour line data connecting means for connecting the starting and ending points of one partitioned image discontinuity with the ending and starting points, respectively, of an adjacent partitioned image contour line to provide an entire image contour line.

13. A pattern recognition apparatus as claimed in claim 12, wherein the portion to be deleted comprises at least one center pixel located between the starting and ending points.

14. A pattern recognition apparatus, comprising:
means for inputting an entire image as entire image data;
means for storing the entire image data;
means for partitioning the entire image data into a plurality of partitioned images, each partitioned image overlapping at least one other partitioned image by a region of no more than one pixel in width;
means for producing a continuous trace of the contour for each partitioned image;
means for storing the contour of each partitioned image as partitioned image contour data;
means for deleting portions of each partitioned image contour data that are located in an overlap region such that a discontinuity in a contour results adjacent each deletion, each said discontinuity having a starting point and an ending point; and
means for connecting the starting and ending points of each partitioned image contour discontinuity with ending and starting points, respectively, of an adjacent partitioned image contour discontinuity so that data representing a continuous trace is formed of the connected partitioned images to obtain data representing a continuous trace of the entire image contour.

15. A pattern recognition apparatus as claimed in claim 14, further comprising means for storing a partitioned image as partitioned image data; wherein said contour tracing means produces a continuous trace from said partitioned image data.

16. A pattern recognition apparatus as claimed in claim 15, wherein said partitioned image storing means has a storing capacity to store, at most, data for one partitioned image at a time.

17. A pattern recognition apparatus as claimed in claim 14, further comprising display means for displaying the contour trace of at least one partitioned image based upon the partitioned image contour data.

18. A pattern recognition apparatus as claimed in claim 17, further comprising means for outputting the partitioned image contour data stored in said contour storing means to said display means.

19. A pattern recognition apparatus as claimed in claim 14, wherein the portion to be deleted comprises at least one center pixel located between the starting and ending points.

20. A pattern recognition method, comprising the steps of:
imaging an object;
partitioning the image into a plurality of partitioned images, at least one of said partitioned images have a single pixel-wide region of overlap with an adjacent partitioned image;
establishing a continuous partitioned image contour trace for each partitioned image;
deleting a portion of at least one continuous partitioned image contour trace that lies in a region of overlap, thus creating a trace discontinuity adjacent each deleted portion, wherein each said discontinuity has a starting point and an ending point; and
connecting the starting and ending points of one of partitioned image discontinuity with the ending and starting points, respectively, of an adjacent partitioned image discontinuity of the same region of overlap.

21. A pattern recognition method as claimed in claim 20, further comprising the step of converting the object image into object image data, wherein said partitioning step partitions the object image data into data representing a plurality of partitioned images, and wherein said contour trace establishing step establishes data representing a continuous partitioned image contour trace for each partitioned image.

22. A pattern recognition method as claimed in claim 21, further comprising the steps of:
storing image data for the entire image before partitioning; and
storing contour trace data for each partitioned image after establishing its contour trace.

23. A pattern recognition method as claimed in claim 20, wherein a portion to be deleted comprises at least one center pixel located between the starting and ending points.

24. A pattern recognition method as claimed in claim 20, wherein a plurality of partitioned images have a single pixel-wide region of overlap with an adjacent partitioned image, and wherein the connecting step connects the starting and ending points of each partitioned image discontinuity with the ending and starting points, respectively, of an adjacent partitioned image discontinuity, thus establishing a continuous image contour trace of the entire image as established by the connected partitioned image traces.

25. A pattern recognition method, comprising the steps of:

imaging an object to obtain an entire object image;

partitioning said entire object image to obtain a plurality of partitioned images, at least one of said partitioned images including a region that overlaps at least one other partitioned image by a width of no more than one pixel;

tracing the contour of each partitioned image in a predetermined direction to obtain a continuous trace for each partitioned image;

deleting portions of each said contour that are located in an overlap region to produce a discontinuity at each deleted portion, each said discontinuity having a starting point and an ending point; and connecting the starting and ending points of one discontinuity to the ending and starting points, respectively, of an adjacent partitioned image discontinuity to obtain a continuous entire image contour trace.

26. A pattern recognition method as claimed in claim 25, wherein each said deletion is performed according to the direction of the continuous trace from which the deletion is made.

* * * * *